(12) United States Patent
Kim et al.

(10) Patent No.: US 10,554,361 B2
(45) Date of Patent: Feb. 4, 2020

(54) METHOD FOR CHANGING REFERENCE SIGNAL ALLOCATION IN ENVIRONMENT ALLOWING OPERATION IN FDR SCHEME AND DEVICE THEREFOR

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 15/566,682

(22) PCT Filed: Nov. 20, 2015

(86) PCT No.: PCT/KR2015/012539
§ 371 (c)(1),
(2) Date: Oct. 13, 2017

(87) PCT Pub. No.: WO2016/171357
PCT Pub. Date: Oct. 27, 2016

(65) Prior Publication Data
US 2018/0083744 A1 Mar. 22, 2018

Related U.S. Application Data

(60) Provisional application No. 62/150,251, filed on Apr. 20, 2015.

(51) Int. Cl.
*H04L 5/00* (2006.01)
*H04L 5/14* (2006.01)

(52) U.S. Cl.
CPC ............ *H04L 5/005* (2013.01); *H04L 5/0058* (2013.01); *H04L 5/14* (2013.01)

(58) Field of Classification Search
CPC ......... H04L 5/14; H04L 5/005; H04L 5/0058; H04L 5/0053; H04L 5/1423; H04L 5/143;
(Continued)

(56) References Cited

U.S. PATENT DOCUMENTS

2014/0348012 A1* 11/2014 Wu ........................ H04W 24/08
370/252
2015/0055515 A1 2/2015 Cheng et al.
2016/0226535 A1* 8/2016 Choi ........................ H04B 1/525

FOREIGN PATENT DOCUMENTS

WO 2010019017 2/2010
WO 2014200212 12/2014
(Continued)

OTHER PUBLICATIONS

M. S. Sim, M. Chung, D. K. Kim and C. Chae, "Low-Complexity Nonlinear Self-Interference Cancellation for Full-Duplex Radios," 2016 IEEE Globecom Workshops (GC Wkshps), Washington, DC, 2016, pp. 1-6. doi: 10.1109/GLOCOMW.2016.7848956.*
(Continued)

*Primary Examiner* — Maharishi V Khirodhar
*Assistant Examiner* — Kenneth P Hunt
(74) *Attorney, Agent, or Firm* — Lee Hong Degerman Kang & Waimey

(57) ABSTRACT

A method for changing reference signal (RS) allocation by a device operating in an FDR scheme may comprise the steps of: determining whether to release an additionally allocated RS according to a transmission power variation of the device or to additionally allocate an RS for channel estimation of a non-linear component of a self-interference signal; and transmitting information on a resource of the RS
(Continued)

to be released or information on a resource of the RS to be additionally allocated, according to the determination.

11 Claims, 7 Drawing Sheets

(58) Field of Classification Search
CPC ....... H04L 5/0048–0051; H04L 27/261–2613; H04L 5/1461; H04B 1/54; H04B 1/56; H04B 1/525; H04B 1/10; H04B 1/1027; H04B 1/1036; H04B 1/1045; H04B 1/1054; H04B 1/1063; H04B 1/1072; H04B 1/1081; H04B 1/109; H04B 1/12; H04B 1/123; H04B 1/126; H04B 1/0475; H04B 15/00–06; H04J 11/0023–0026
See application file for complete search history.

(56) References Cited

FOREIGN PATENT DOCUMENTS

| | | |
|---|---|---|
| WO | 2014208953 | 12/2014 |
| WO | 2015053528 | 4/2015 |

OTHER PUBLICATIONS

M. S. Sim, M. Chung, D. Kim, J. Chung, D. K. Kim and C. Chae, "Nonlinear Self-Interference Cancellation for Full-Duplex Radios: From Link-Level and System-Level Performance Perspectives," in IEEE Communications Magazine, vol. 55, No. 9, pp. 158-167, Sep. 2017. doi: 10.1109/MCOM.2017.1600264.*

PCT International Application No. PCT/KR2015/012539, Written Opinion of the International Searching Authority dated Feb. 23, 2016, 17 pages.

* cited by examiner

METHOD FOR CHANGING REFERENCE SIGNAL ALLOCATION IN ENVIRONMENT ALLOWING OPERATION IN FDR SCHEME AND DEVICE THEREFOR

CROSS-REFERENCE TO RELATED APPLICATIONS

This application is the National Stage filing under 35 U.S.C. 371 of International Application No. PCT/KR2015/012539, filed on Nov. 20, 2015, which claims the benefit of U.S. Provisional Application No. 62/150,251, filed on Apr. 20, 2015, the contents of which are all hereby incorporated by reference herein in its entirety.

TECHNICAL FIELD

The present invention relates to wireless communication, and more particularly, to a method for changing reference signal (RS) allocation in an environment allowing operation in an FDR scheme and a device therefor.

BACKGROUND ART

Full-duplex communication is a technology capable of theoretically doubling the capacity of a system compared to conventional half-duplex communication in which time resources or frequency resources are orthogonally divided by performing transmission and reception simultaneously by a node.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention devised to solve the problem lies in a method for changing reference signal (RS) allocation by a device operating in a full duplex communication (FDR) scheme.

Another object of the present invention is to provide a device for changing reference signal (RS) allocation in a full duplex communication (FDR) environment.

The technical objects to be achieved by the present invention are not limited to the aforementioned technical objects and other technical objects which are not mentioned can be clearly understood by those skilled in the art from the following description.

Technical Solution

The object of the present invention can be achieved by providing a method for changing reference signal (RS) allocation by an apparatus operating in a Full Duplex Radio (FDR) scheme, the method including determining whether to release an additionally allocated RS or to additionally allocate an RS for channel estimation of a nonlinear component of a self-interference signal according to transmit power change of the apparatus, and according to the determination, transmitting information on a resource of the RS to be released or information on a resource of the RS to be additionally allocated.

The determining may include determining to additionally allocate the RS for channel estimation of the nonlinear component of the self-interference signal when a transmit power of the apparatus is increased.

The determining may include determining to release the additionally allocated RS when the transmit power of the apparatus is decreased.

The determining according to change in the transmit power may be performed only when the transmit power is greater than or equal to a predefined threshold. The information on the resource of the RS to be released may include resource position information on the RS to be released. The information on the resource of the RS to be additionally allocated may include resource position information on the RS to be additionally allocated.

In another aspect of the present invention, provided herein is an apparatus for changing reference signal (RS) allocation in an environment allowing operation in a Full Duplex Radio (FDR) scheme, the apparatus including a processor configured to determine whether to release an additionally allocated RS or to additionally allocate an RS for channel estimation of a nonlinear component of a self-interference signal according to change in transmit power of the device, and a transmitter configured to transmit information on resource of the RS to be released or information on resource of the RS to be additionally allocated, according to the determination.

The processor may be configured to determine to additionally allocate the RS for channel estimation of the nonlinear component of the self-interference signal when the transmit power of the apparatus is increased.

The processor may be configured to determine to release the additionally allocated RS when the transmit power of the apparatus is decreased.

The processor may perform the determination only when the transmit power is greater than or equal to a predefined threshold. The information on the resource of the RS to be released may include resource position information on the RS to be released. The information on the resource of the RS to be additionally allocated may include resource position information on the RS to be additionally allocated.

Advantageous Effects

According to an embodiment of the present invention, resources may be efficiently used through flexible RS allocation and release according to the FDR situation, and therefore communication performance may be improved may be improved.

It will be appreciated by those skilled in the art that that the effects that can be achieved through the present invention are not limited to those described above and other effects of the present invention will be more clearly understood from the following description.

DESCRIPTION OF DRAWINGS

The accompanying drawings, which are included to provide a further understanding of the invention and are incorporated in and constitute a part of this application, illustrate embodiments of the disclosure and together with the description serve to explain the principle of the invention.

BEST MODE

Figure 1:
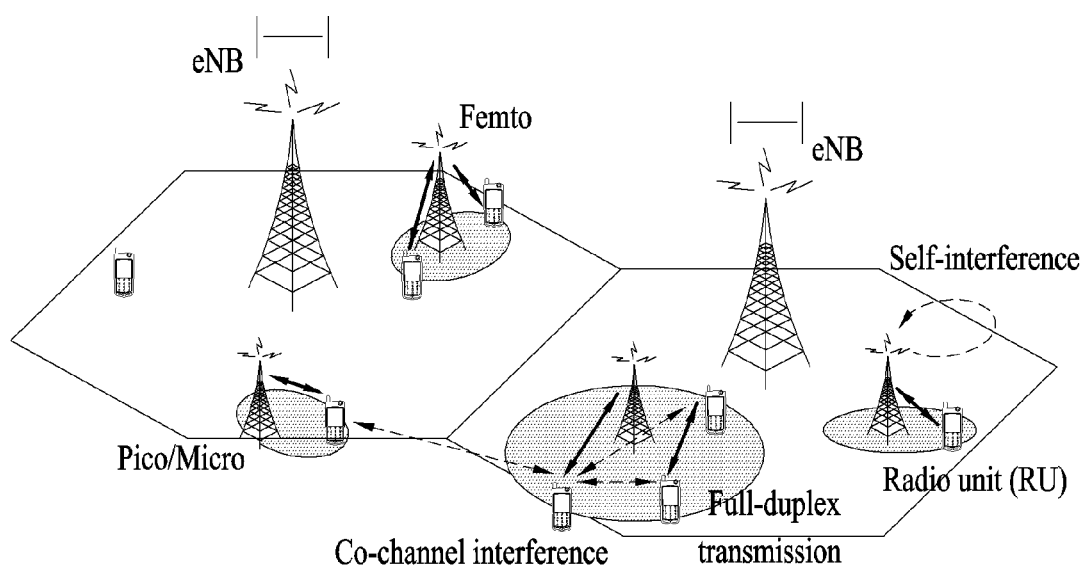
FIG. 1 is an exemplary view illustrating a network supporting a full-duplex/half-duplex communication operation mode of a user equipment (UE) proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
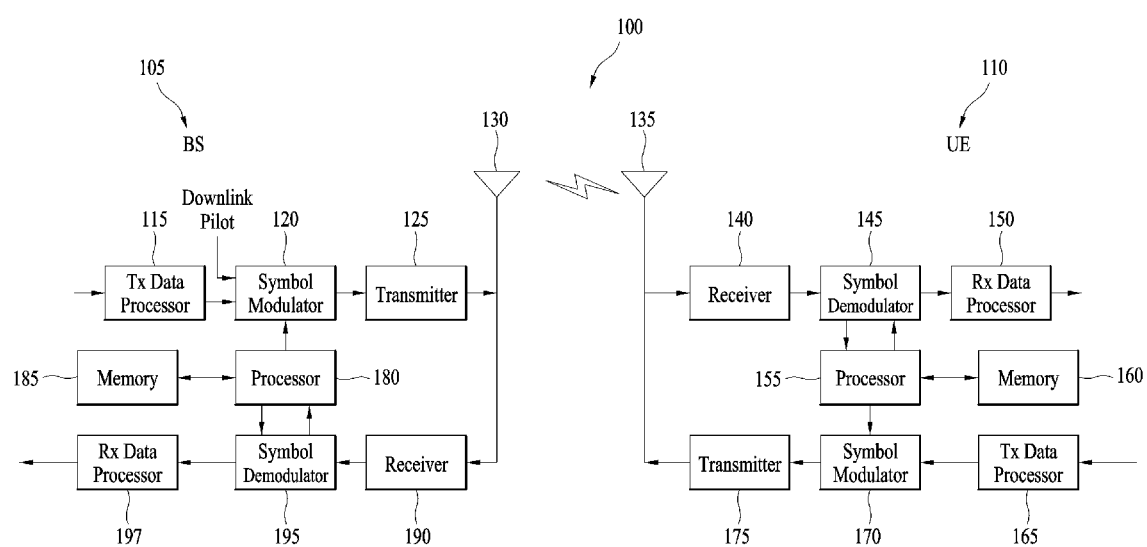
FIG. 2 is a block diagram for configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
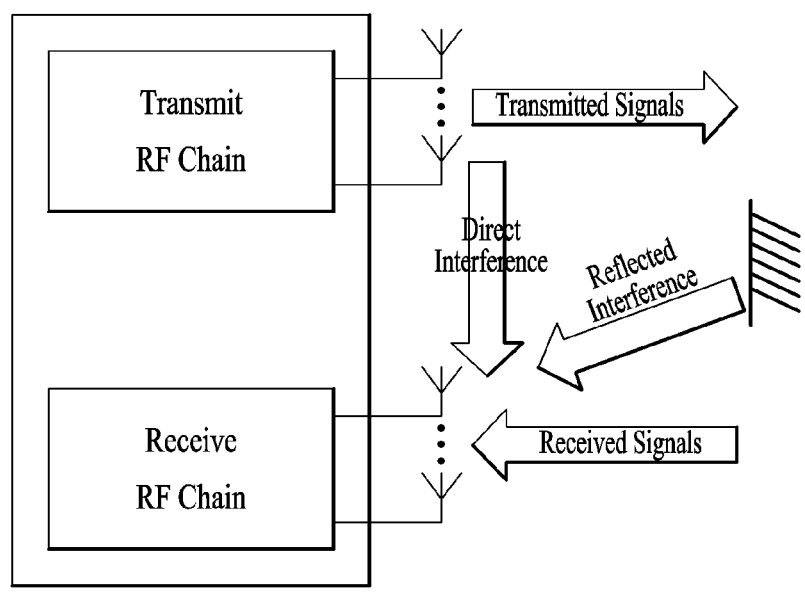
FIG. 3 is a conceptual diagram of self-interference (SI) and Tx/Rx links in an FDR communication environment.

FIG. 3 is a conceptual diagram of self-interference (SI) and Tx/Rx links in an FDR communication environment.

Referring to FIG. 3, the SI can be divided into direct interference, which is caused when a signal transmitted from a transmit (Tx) antenna is received at an Rx antenna of the same device without path attenuation, and reflected interference, which is caused when a signal transmitted from a Tx antenna is reflected on a surrounding object and then received at an Rx antenna of the same device. In addition, the strength of the SI is extremely higher than that of a desired signal due to a physical distance difference. Thus, the SI should be cancelled for efficient operation of the FDR system.

In order for the FDR system to operate effectively, the requirements of the self-IC according to the maximum transmission power can be determined as shown in the following Table 1. Self-IC requirements when the FDR is applied to a mobile communication system (BW=20 MHz).

TABLE 1

Self-IC requirements when the FDR is applied to a mobile communication system (BW = 20 MHz)

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed to $N_{0,BW}$=−174 dBm+10×log$_{10}$(BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
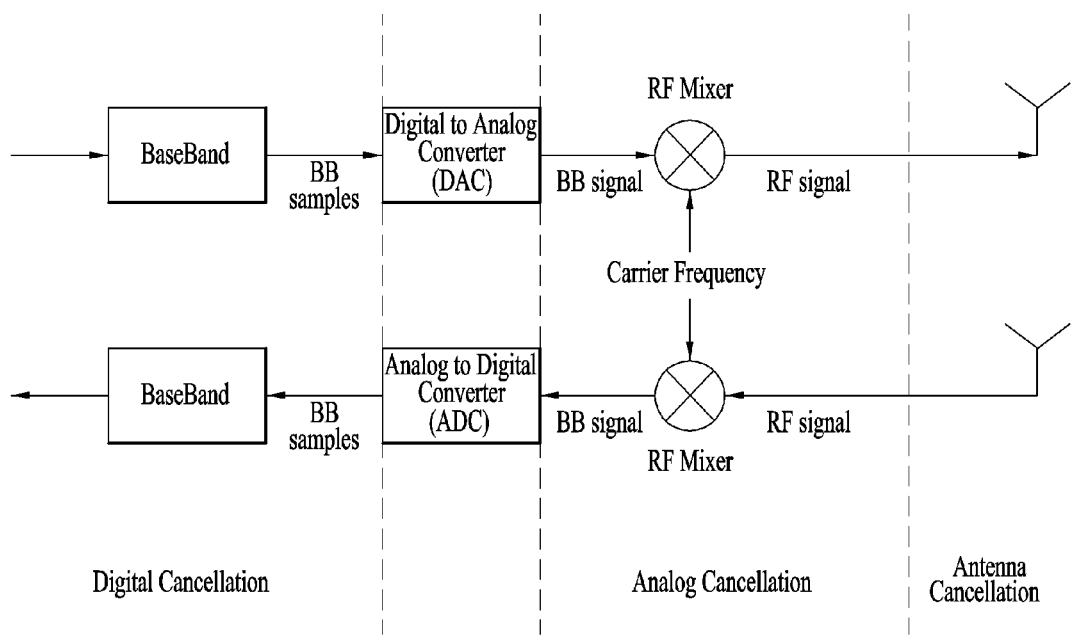
FIG. 4 is a view illustrating positions at which three interference schemes are applied, in a Radio Frequency (RF) Tx and Rx end of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
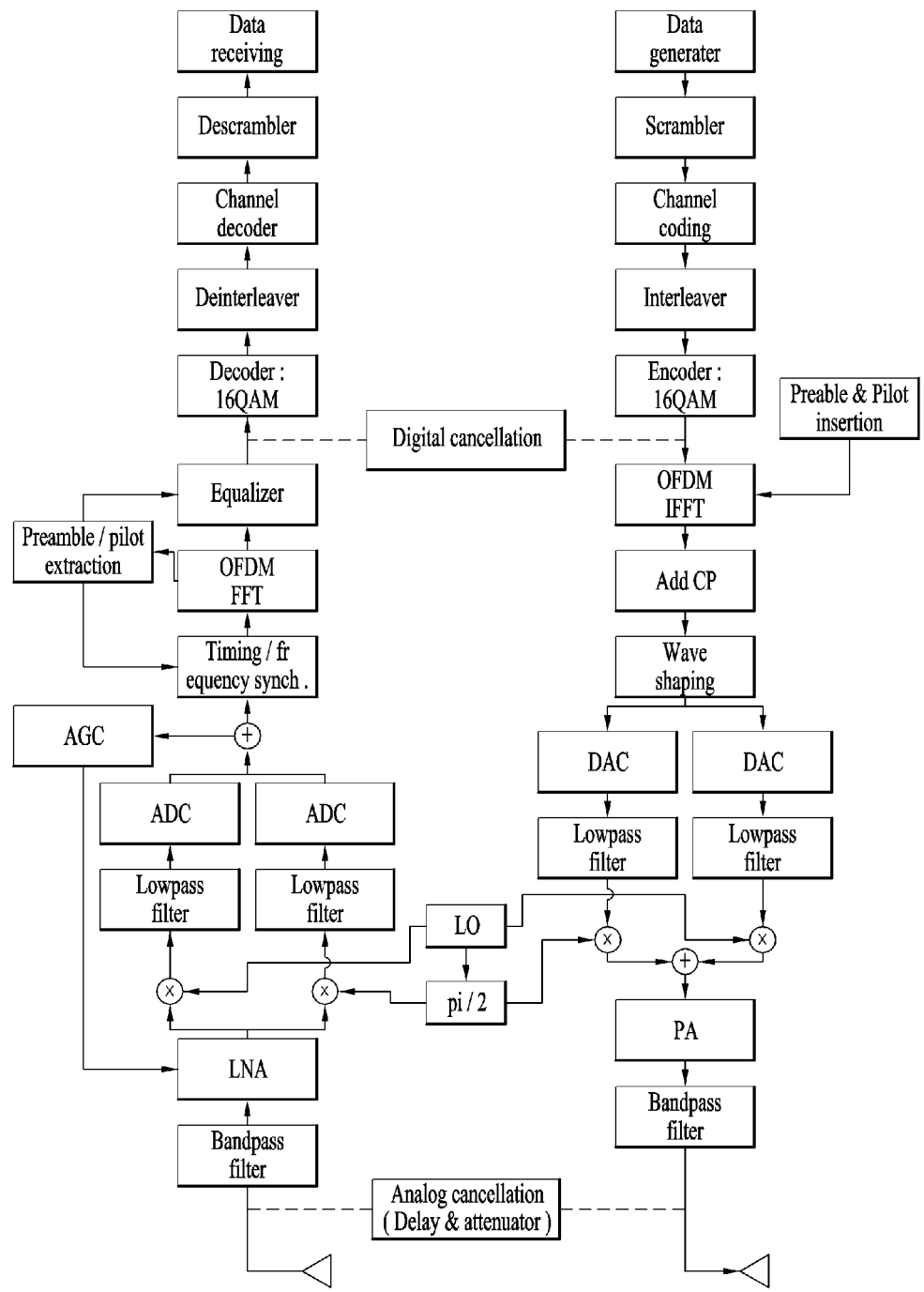
FIG. 5 is a block diagram for proposed Self-IC in an OFDM communication environment based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling in FDR System

Since the FDR system uses the same frequency between a transmitted signal and a received signal, nonlinear components at the RF end have a great influence. Particularly, the transmitted signal is distorted due to nonlinearity of active devices such as a power amplifier (PA) and a low noise amplifier (LNA). The transmitted signal subjected to such distortion may be modeled with high-order generated components. Among the components, even-order components can be effectively removed due to the conventional AC coupling or filtering technique as they affect the DC periphery. However, since the odd-order components occur adjacent to the existing frequency, they are difficult to remove, unlike the even-order signal components, and have a significant effect. Considering nonlinearity of the odd-order signal components, the received signal after ADC in the FDR system may be expressed using the Parallel Hammerstain (PH) model as given by Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{Equation 1}$$

where $x_D(n)$ is data the RF end of the device desires to receive, $h_D(n)$ is a desired channel that the data to be received undergoes, $x_{SI}(n)$ is the data transmitted by the RF end of the device, $h_{SI,k}(n)$ is a self-channel that the data transmitted by the RF end of the device undergoes, k denotes a linear component when set to 1 and denotes a nonlinear component when set to an odd number greater than or equal to 3, and z(n) is additive white Gaussian noise (AWGN).

When a base station (eNB) or a terminal (UE) operates in a full-duplex scheme for downlink transmission and uplink transmission, if a transmission power is changed according to change of a channel environment and a surrounding environment, a problem may occur due to change in self-interference cancellation performance at the BS or the UE. More specifically, as the power of the BS increases, reception of uplink data may suffer a problem due to change in self-interference cancellation performance at the BS, and reception of downlink data may suffer a problem due to change in self-interference cancellation performance at the UE. For example, when the distance between the UE and the BS is increased due to movement of the UE, the UE may increase the transmit power by performing open-loop power control, or the BS may increase the transmit power by performing closed-loop power control. At this time, the amount of power of self-interference increases due to the increased transmit power at the UE. Particularly, for the nonlinear SI signal components, which are merely at a power level corresponding to the noise floor and are not considered when low transmit power is given, the power of interference increases sharply as the transmit power increases. In this case, with the digital self-IC technique considering only linear components, a problem is raised in performance of the FDR system as the residual SI signal is rapidly increased. The nonlinear components of a SI signal including a high-order signal component require the non-linear components to be considered because the increase rate of the interference signal with increase in transmit power becomes larger than that of the linear component as the order increases. An increase in the nonlinear SI signal component with increase in transmit power is shown in FIG. 6.

Figure 6:
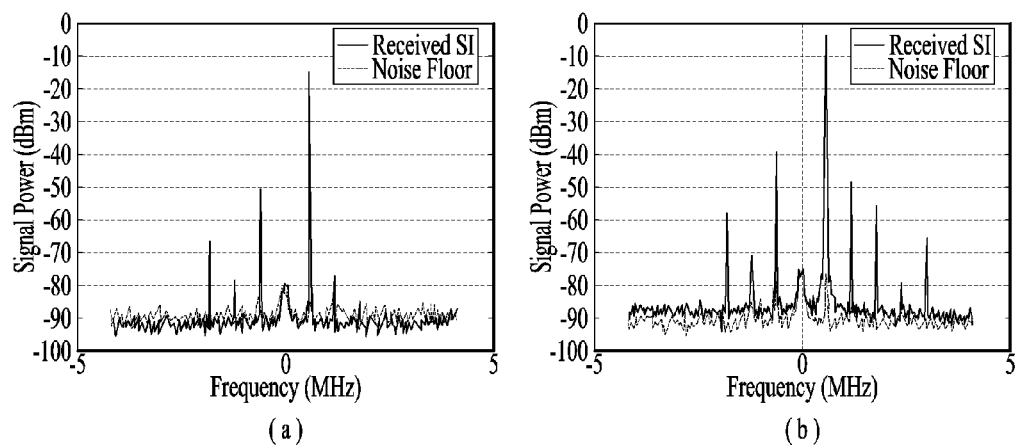
FIG. 6 is a graph showing an increase in a nonlinear SI signal component with an increase in transmit power at an RF end of a device.

FIG. 6 is a graph showing an increase in a nonlinear SI signal component with an increase in transmit power at an RF end of a device.

FIG. 6(a) depicts the strength of a received SI signal when the transmit power is −10 dBm, and FIG. 6(b) depicts the strength of a received SI signal when the transmit power is increased to 20 dBm. It can be seen from FIG. 6 that the strength of the received SI signal in the case of FIG. 6(b), in which the transmit power is increased to 20 dBm, is greater than the strength of the received SI signal in the case of FIG. 6(a) on the y-axis (the axis indicated by signal power (dBm)). This means that increasing the transmit power at the RF end of the device increases the strength of the received SI signal entering the device.

Figure 7:
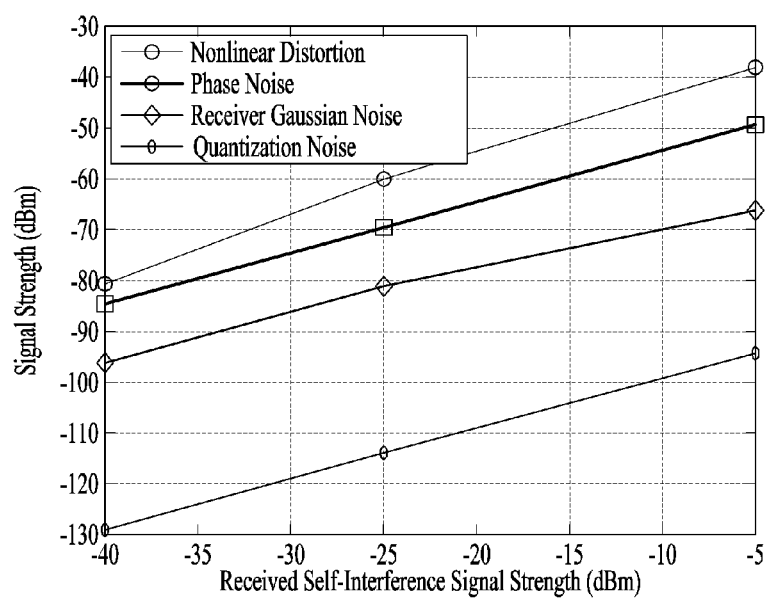
FIG. 7 is a graph showing the intensity of a nonlinear SI interference signal (nonlinear distortion signal) according to the power intensity of a reception self-interference signal.

FIG. 7 is a graph showing the intensity of a nonlinear SI interference signal (nonlinear distortion signal) according to the power intensity of a reception self-interference signal.

Referring to FIG. 7, the signal strength of nonlinear distortion increases as the received SI power increases. As described above, when the device increases the transmit power, the strength of the received SI signal increases, and as a result the strength of the nonlinear distortion signal at the receiving end also increases.

On the other hand, when the RF transmit power of the device is lowered, high-order components that have been conventionally considered may not need to be considered. Therefore, it is necessary for the FDR system to perform digital self-IC in consideration of a high-order term.

More specifically, in order to remove the nonlinear SI signal components, channel estimation for a high-order nonlinear signal component is required. To this end, additional RS allocation for SI channel estimation considering a high-order nonlinear signal component is required, unlike the reference signal (RS) in the legacy LTE system.

For example, in the legacy LTE system, six common RSs (CRS) are allocated for one antenna port per resource block (RB). On the other hand, in the FDR system, additional CRSs may be needed (e.g., six CRSs are additionally needed) for channel estimation of the nonlinear SI signal up to the third order due to increase in transmit power. When six CRSs are additionally needed, a total of twelve RSs may be used.

Further, due to significant increase in transmit power, in order to perform channel estimation for a fifth-order non-linear SI signal, more CRSs may be needed (for example, 6 additional CRSs may be needed) than in the case of channel estimation of a nonlinear SI signal of high orders up to the third order, and thus a total of 18 RSs may be used if 6 CRSs are additionally necessary. That is, the above example assumes that 6 RSs are needed per order.

In contrast to the above example, in the FDR system, resource allocation of the 6 CRSs used for channel estimation of the fifth-order nonlinear SI signal among the 18 RSs may be released due to decrease in transmit power, and thus a total of 12 RSs may be used in the FDR system. In addition, resource allocation of the six CRSs used for channel estimation of nonlinear SI signals of high orders up to the third order may be released due to significant decrease in transmit power, and thus a total of 6 RSs may be used.

However, a BS or a UE operating in the FDR scheme may allocate additional RSs for estimating nonlinear SI signal components by power control. For example, in the case where it is necessary to estimate third-order nonlinear SI signal components in the midst of estimation of only linear SI signal components, or in the case where nonlinear SI signal components of orders up to the third order have been estimated, but it is necessary to estimate nonlinear SI signal components of orders up to the fifth order, the BS or the UE may allocate additional RSs. However, the legacy LTE system cannot recognize the corresponding resource allocation information and, due to absence of such information, interference occurs between systems operating with the legacy system in FDR, increasing the probability of pilot contamination.

In contrast, a BS or a UE operating at high transmit power in the FDR scheme may release, by power control, existing RS allocation for estimation of higher-order nonlinear SI signal components. For example, in a case where nonlinear SI signal components of orders up to the fifth order have been estimated, but it is necessary to estimate the nonlinear SI signal components of orders up to the third order by transmit power control, or in a case where nonlinear SI signal components of orders up to the third order have been estimated, but only linear SI signal components need to be estimated by transmit power control, RS resource allocation may be released. In this case, the legacy LTE system cannot recognize the resource deallocation information on the corresponding RS resources and, due to the absence of such information, the efficiency of resource use may be lowered.

Therefore, in order to stably drive the FDR scheme, signaling is required to allow the BS and the UE to recognize the resource usage status of RSs for estimation of nonlinear SI signal components when the transmit power is increased or decreased. Methods for this will described below.

Figure 8:
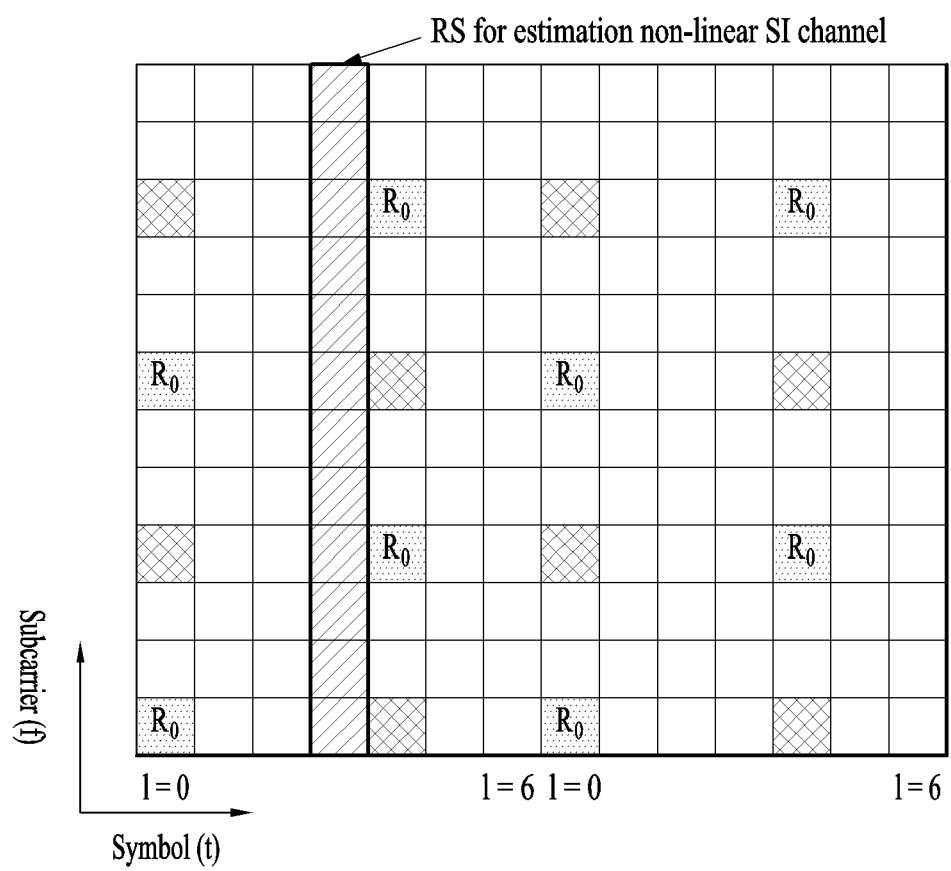
FIG. 8 is a diagram illustrating an example of RS allocation for estimation of a channel of a nonlinear component of a self-interference signal.

FIG. 8 is a diagram illustrating an example of RS allocation for estimation of a channel of a nonlinear component of an SI signal.

Referring to FIG. 8, $R_0$ in the illustrated subframe is an existing allocated RS. In FIG. 8, the fourth symbol in the time domain is a symbol to which an RS is additionally allocated for channel estimation of the nonlinear component of an SI signal. However, although the fourth symbol is illustrated as a symbol to which an RS is additionally allocated, additional RSs may be allocated to any symbol to which $R_0$ is not allocated, in addition to the fourth symbol.

Embodiment 1: A Method for RS Allocation in a BS According to Change in Transmit Power According to the transmit power change due to open-loop power control or closed-loop power control of the BS, the BS may allocate and transmit an additional RS signal in downlink transmission for channel estimation of the nonlinear component of the residual SI signal, or may allocate a downlink resource previously allocated to the RS signal for nonlinear component estimation to data. In the present invention, the residual SI signal may refer to an SI signal remaining at the digital stage after antenna self-IC and/or analog IC. The BS may signal allocation information on the changed downlink resource to the UE over a physical layer (for example, a Physical Downlink Control Channel (PD-CCH), a Physical Downlink Shared CHannel (PDSCH)) or an upper layer signal (e.g., a Radio Resource Control (RRC) signal).

Upon determining that additional RS allocation is needed for channel estimation of the nonlinear component of the residual SI signal due to increase in downlink transmit power of the BS, the BS may signal additionally allocated RS information on the downlink (e.g., information on the resource location of the additionally allocated RS) to the UE. Thereby, interference in the RS generated in performing channel estimation may be prevented and the BS may perform stable digital self-IC based on high channel estimation performance. For example, the UE may determine available resources based on the RS information received from the BS through signaling. More specifically, the UE may puncture a resource on which the RS added in the uplink transmission is located, or may transmit the signal at a lower power on that resource than a resource to which the conventional RS is allocated.

Upon determining that an RS which was additionally allocated for channel estimation of the nonlinear component of a residual SI signal is not needed due to decrease in downlink transmit power of the BS, the BS may release allocation of the RS and use the released RS for other purposes (e.g., enhanced PDCCH (ePDCCH) or PDSCH). The BS may signal information about the released downlink resource (RS resource) to the UE such that the uplink resources of the UE that have been restricted by existing interference may be used for another purpose (for example, PUCCH (Physical Uplink Control CHannel) or PUSCH (Physical Uplink Shared CHannel)). Thereby, efficiency of the uplink resources may be enhanced. For example, based on the RS resource allocation information received from the BS, the UE may cancel the restriction on the resources that have been previously punctured on uplink so as not to be used or to be used for low power transmission and allow the same to be used like other resources under the same condition.

Embodiment 2: A Method for RS Allocation in a UE According to Change in Transmit Power According to transmit power change due to open-loop power control or closed-loop power control of the UE, the UE may allocate and transmit an additional RS signal in uplink transmission for channel estimation of the nonlinear component of the residual SI signal, or may allocate data to an uplink resource previously allocated to the RS signal for nonlinear component estimation. The UE may signal allocation information on the changed uplink resource to the BS over a physical layer (for example, a Physical Downlink Control Channel (PDCCH), a Physical Downlink Shared Channel (PDSCH)) or an upper layer signal (e.g., a Radio Resource Control (RRC) signal).

Upon determining that additional RS allocation is needed for channel estimation of the nonlinear component of the residual SI signal due to increase in uplink transmit power of the UE, the UE may signal additionally allocated RS information on the uplink to the BS. Thereby, interference in the RS generated in performing channel estimation in the UE may be prevented and the UE may perform stable digital self-IC based on high channel estimation performance. For example, the BS may determine available resources based on the RS information received from the UE through signaling. More specifically, the BS may puncture a corresponding resource position in the downlink transmission, or may transmit downlink power at a lower power.

Upon determining that an RS which was additionally allocated for channel estimation of the nonlinear component of a residual SI signal is not needed due to decrease in uplink transmit power of the UE, the UE may release allocation of the RS and use the released uplink resource for other purposes (e.g., PUCCH or PUSCH). The UE may signal information about the released uplink resource (e.g., information about the position and size of the released uplink resource) to the BS such that the uplink resources of the UE that have been restricted by existing interference may be used for another purpose (for example, PDCCH, ePDCCH, PDSCH, etc.). Thereby, efficiency of the uplink resources may be enhanced. For example, based on the RS resource allocation information received from the UE, the BS may cancel the restriction on the resources that have been previously punctured in downlink transmission so as not to be used or to be used for low power transmission and allow the same to be used like other resources under the same condition.

Embodiment 3

The resource allocation information on the RS signal changed according to change in transmit power of the BS defined in Embodiments 1 and 2 may be signaled to a neighbor BS and a small-cell BS over an X2 interface and an upper layer signal (e.g., the Radio Resource Control (RRC) signal).

Embodiment 3

The UE may signal resource allocation information on the RS signal changed according to change in power of the UE to a neighbor UE using a D2D signal or an upper layer signal (e.g., a Radio Resource Control (RRC) signal).

In order to reduce overhead of transmitting the resource allocation information on the RS signal changed according to change in power of the BS or the UE over signaling, the resource allocation information on the RS according to the transmit power may be predefined in a table. Therefore, a node may transmit an index in the table or a difference between the index and a previously used table index to a counterpart node such that the correspondent node can recognize the RS resource allocation information. Alternatively, other information (for example, transmit power information on the UE) may be transmitted to allow the counterpart node to recognize the RS resource allocation information based on the received transmit power information on the UE and the table. In this case, the table in which the resource allocation information on the RS according to transmit power is predefined is pre-shared and recognized by the BS and the UE.

In the above embodiments, the UE may selectively operate only when the absolute value of the transmit power of the UE is greater than or equal to a predetermined threshold. For example, in the case of a UE transmitting a signal at a transmit power less than or equal to a predetermined transmit power (for example, 10 dBm or less), if the absolute value of the transmit power is lower than a predetermined threshold even when the transmit power is increased or decreased, stable operation of the self-IC technique may be enabled and thus resource allocation information on additional RS allocation may not be transmitted.

The above embodiments may selectively operate only when the BS or the UE operates in the FUR mode. The BS may operate in the FDR mode when a UE operating in the FDR mode is connected or a UE desiring downlink reception and a UE desiring uplink transmission desire communication simultaneously. In this case, the embodiments may be selectively operated. In general, the amount of the downlink traffic is larger than that of the uplink traffic. Therefore, in order for the UEs to operate in the FUR mode, some of the UEs desiring uplink transmission may operate in the FDR mode and may thus selectively operate as described above. For example, the BS may estimate the duration of the FDR operation of a UE through a buffer status report (BSR) of the UE, and trigger transmission of the control signal of the UE in order to receive necessary information over a physical layer or upper layer signal from the UE at a desired time.

In addition, the proposed schemes described above may be implemented independently, or may be implemented as a combination of some of the proposed schemes. A rule may be defined such that the BS informs the UE of whether or not the proposed methods are applied (or information on the rules of the proposed methods) over a predefined signal (e.g., a physical layer signal or an upper layer signal).

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

It will be appreciated by those skilled in the art that the present invention can be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method and device for changing reference signal (RS) allocation in an environment allowing operation in the FDR scheme can be used industrially in various wireless communication systems.

The invention claimed is:

1. A method for changing reference signal (RS) allocation by an apparatus operating in a Full Duplex Radio (FDR) scheme, the method comprising:
    determining whether to release an additionally allocated RS, or to additionally allocate an RS for channel estimation of a nonlinear component of a self-interference signal, according to a change in transmit power of the apparatus;
    wherein the determining further comprises:
    determining to additionally allocate the RS for the channel estimation of the nonlinear component of the self-interference signal when the transmit power of the apparatus is increased; and
    according to the determining, transmitting information on a resource of the additionally allocated RS to be released or information on a resource of the RS to be additionally allocated.

2. The method of claim 1, wherein the determining further comprises:
    determining to release the additionally allocated RS when the transmit power of the apparatus is decreased.

3. The method of claim 1, wherein the determining according to the change in the transmit power is performed only when the transmit power is greater than or equal to a predefined threshold.

4. The method of claim 1, wherein the information on the resource of the additionally allocated RS to be released comprises resource position information on the additionally allocated RS to be released.

5. The method of claim 1, wherein the information on the resource of the RS to be additionally allocated comprises resource position information on the RS to be additionally allocated.

6. An apparatus for changing reference signal (RS) allocation in an environment allowing operation in a Full Duplex Radio (FDR) scheme, the apparatus comprising:
    a processor configured to determine whether to release an additionally allocated RS, or to additionally allocate an RS for channel estimation of a nonlinear component of a self-interference signal, according to a change in transmit power of the apparatus;
    wherein the processor is further configured to determine to additionally allocate the RS for the channel estimation of the nonlinear component of the self-interference signal when the transmit power of the apparatus is increased; and
    a transmitter configured to transmit information on a resource of the additionally allocated RS to be released or information on a resource of the RS to be additionally allocated according to the determination.

7. The apparatus of claim 6, wherein the processor is further configured to determine to release the additionally allocated RS when the transmit power of the apparatus is decreased.

8. The apparatus of claim 6, wherein the processor performs the determination only when the transmit power is greater than or equal to a predefined threshold.

9. The apparatus of claim 6, wherein the information on the resources of the additionally allocated RS to be released comprises resource position information on the additionally allocated RS to be released.

10. The apparatus of claim 6, wherein the information on the resources of the RS to be additionally allocated comprises resource position information on the RS to be additionally allocated.

11. A method for an apparatus operating in a Full Duplex Radio (FDR) scheme, the method comprising:
  determining to release an additionally allocated reference signal (RS) based on a transmit power of the apparatus decreasing;
  determining to additionally allocate an RS for channel estimation of a nonlinear component of a self-interference signal based on the transmit power of the apparatus increasing;
  transmitting information on a resource of the additionally allocated RS to be released based on the determining to release the additionally allocated RS; and
  transmitting information on a resource of the RS to be additionally allocated based on the determining to additionally allocate the RS.

* * * * *